United States Patent [19]
Webb, Jr. et al.

[11] Patent Number: 5,222,223
[45] Date of Patent: Jun. 22, 1993

[54] METHOD AND APPARATUS FOR ORDERING AND QUEUEING MULTIPLE MEMORY REQUESTS

[75] Inventors: David A. Webb, Jr., Berlin; Ricky C. Hetherington, Northboro; John E. Murray, Acton; Tryggve Fossum, Northboro; Dwight P. Manley, Holliston, all of Mass.

[73] Assignee: Digital Equipment Corporation, Maynard, Mass.

[21] Appl. No.: 306,870

[22] Filed: Feb. 3, 1989

[51] Int. Cl.$^5$ .................. G06F 13/16; G06F 12/00
[52] U.S. Cl. .................. 395/425; 364/DIG. 1; 364/231.8; 364/242.91; 364/964.26; 395/400
[58] Field of Search ... 364/200 MS File, 900 MS File; 395/425, 400

[56] References Cited

U.S. PATENT DOCUMENTS

| | | | |
|---|---|---|---|
| 3,949,379 | 4/1976 | Ball | 395/775 |
| 4,392,200 | 7/1983 | Arulpragasam | 395/425 |
| 4,500,958 | 2/1985 | Manton et al. | 395/425 |
| 4,551,799 | 11/1985 | Ryan et al. | 395/425 |
| 4,695,943 | 9/1987 | Keeley et al. | 364/200 |
| 4,722,046 | 1/1988 | Kasrazadeh et al. | 364/200 |
| 4,729,093 | 3/1988 | Mothersole et al. | 395/375 |
| 4,872,111 | 10/1989 | Daberkow et al. | 364/200 |
| 4,875,160 | 10/1989 | Brown, III | 364/200 |
| 5,006,980 | 4/1991 | Sanders et al. | 364/200 |
| 5,027,270 | 6/1991 | Riordan et al. | 364/200 |

FOREIGN PATENT DOCUMENTS

| | | |
|---|---|---|
| 0227118 | 7/1987 | European Pat. Off. |
| 0259095 | 3/1988 | European Pat. Off. |
| 0265108 | 4/1988 | European Pat. Off. |

OTHER PUBLICATIONS

Fossum et al., "An Overview of the VAX 8600 System," Digital Technical Journal, No. 1, Aug. 1985, pp. 8-23.
Troiani et al., "The VAX 8600 I Box, A Pipelined Implementation of the VAX Architecture," Digital Technical Journal, No. 1, Aug. 1985, pp. 24-42.
Levy and Eckhouse, Jr., *Computer Programming and Architecture, The VAX*-11, Digital Equipment Corporation, 1980, pp. 263-276, 296-303, 351-368.
G. Desrochers, *Principles of Parallel and Multiprocessing*, Intertext Publications, Inc., McGraw-Hill Book Co., 1987, pp. 68-71.
A. J. Smith, "Pipelining," Computing Surveys, vol. 14, No. 3 (Sep. 1982), p. 518.
Fossum et al., "New VAX Squeezes Mainframe Power into Mini Package," Computer Design, vol. 24, No. 3, (Mar. 1985), Littleton, Mass., pp. 173-181.

*Primary Examiner*—Glenn Gossage
*Attorney, Agent, or Firm*—Arnold, White & Durkee

[57] ABSTRACT

In a pipelined computer system 10, memory access functions (requests) are simultaneously generated from a plurality of different locations. These multiple requests are passed through a multiplexer 50 according to a prioritization scheme based upon the operational proximity of the request to the instruction currently being executed. In this manner, the complex task of converting virtual-to-physical addresses is accomplished for all memory access requests by a single translation buffer 30. The physical address output from the translation buffer 30 are passed to a cache 28 through a second multiplexer 40 according to a second prioritization scheme based upon the operational proximity of the request to the instruction currently being executed. The first and second prioritization schemes differ, in that the memory is capable of handling other requests while a higher priority "miss" is pending. Thus, the prioritization scheme temporarily suspends the higher priority request while the desired data is being retrieved from main memory 14, but continues to operate on a lower priority request so that the overall operation will be enhanced if the lower priority request hits in the cache 28.

9 Claims, 5 Drawing Sheets

METHOD AND APPARATUS FOR ORDERING AND QUEUEING MULTIPLE MEMORY REQUESTS

RELATED APPLICATIONS

The present application discloses certain aspects of a computing system that is further described in the following U.S. patent applications filed concurrently with the present application: D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989 and issued as U.S. Pat. No. 5,125,083 on Jun. 23, 1992; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 306,866 filed Feb. 3, 1989, and issued as U.S. Pat. No. 4,985,825 on Jan. 15, 1991; Hetherington et al., WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991.

FIELD OF THE INVENTION

This invention relates generally to an apparatus for controlling and prioritizing memory requests from multiple ports, and more particularly, to an apparatus having a multiplicity of such requesting ports optimized for pipelined execution with maximum parallelism and minimum conflicts between pipeline stages.

DESCRIPTION OF THE RELATED ART

Simple computer systems typically access memory sequentially and from only a single point. Ordinarily, the execution unit initiates all memory access functions at the time the data is actually desired. For example, only when the central processing unit (CPU) has completed executing one instruction and is ready to execute the next instruction will that next instruction be fetched from main memory. Further, if the instruction currently being executed requires a memory read operation to be performed, nothing is done by operand processing unit (OPU) to initiate that read operation and retrieve the desired operand until the execution unit orders the OPU to perform. Moreover, once the OPU has performed its singular function at the direction of the CPU, it simply sits idle until the current instruction is completely executed and the next instruction is retrieved. Accordingly, by waiting to request the data until the data is actually needed, the execution unit must simply wait, doing nothing until the requested data is returned from memory.

In order to more efficiently use the components of the CPU, slightly more complex computer systems employ an instruction prefetching stage. The instruction prefetching stage operates independent of the execution unit to retrieve instructions so that they are immediately available to the execution unit when execution of the current instruction is completed. In these computer systems, the instruction prefetching stage is a fairly simple, low-cost device that significantly enhances the operating speed of the computer system. The simplicity of such systems allow them to have completely independent access to the memory. That is to say, memory requests initiated by the execution unit do not share resources with memory requests initiated by the instruction prefetching stage. Thus, there are no memory access conflicts.

With the advent of high-speed, pipelined computer systems, instruction processing has been separated into a multiplicity of smaller stages, where each stage continuously performs its process on each instruction substantially independent of the operations performed by each of the other stages. Thus, instead of one instruction being processed at a time, multiple instructions are in various stages of processing at the same time. However, in a complex instruction set machine, memory references are made for a variety of purposes. These memory references are logically performed at different stages in the pipeline. Thus, in a pipelined computer system, memory requests are generated from a plurality of different pipeline stages.

It would be extremely difficult and expensive to construct a pipelined computer system that allowed each pipeline stage completely independent access to the memory. Complex and expensive resources would be duplicated for each pipeline stage. Therefore, it is desirable to produce a pipelined computer system that maximizes independent, parallel access to the memory while limiting the duplication of complex and expensive resources.

The present invention is directed to overcoming one or more of the problems set forth above.

SUMMARY OF THE INVENTION

The primary object of the invention is to provide a pipelined computer system that multiplexes memory requests according to a priority scheme.

Another object of the present invention is to provide a multiplexed and prioritized memory access scheme that adapts to handle the most critical memory requests first, but allows other less critical requests to be processed when the highest priority request cannot be immediately served.

In one aspect of the present invention an apparatus is provided for controlling independent memory access requests originating from a plurality of locations or pipelined stages in a pipelined computer system. Independent memory access requests, for example, originate from an instruction buffer, an operand processing unit, and an execution unit. The instruction buffer, the operand processing unit, and the execution unit are pipelined stages in the preferred pipelined computer system. The apparatus temporarily stores each of the memory access requests in a plurality of parallel locations. A first multiplexing circuit accesses the stored memory access requests according to a first prioritization scheme and delivers a selected one of the stored memory access requests to a translation buffer. The translation buffer receives the selected one of the stored memory access requests, converts the selected request to a physical memory address, and delivers the physical memory address to a respective one of a plurality of registers. A second multiplexing circuit accesses the physical addresses stored in the registers according to a second prioritization scheme and delivers a selected one of the stored physical addresses. Finally, a cache receives the stored physical address, compares the stored address to the addresses currently maintained in the cache, assesses the data stored at the stored address in response to a hit, and initiates a cache refill in response to detecting a miss.

BRIEF DESCRIPTION OF THE DRAWINGS

Other objects and advantages of the invention will become apparent upon reading the following detailed description and upon reference to the drawings in which.

Figure 1:
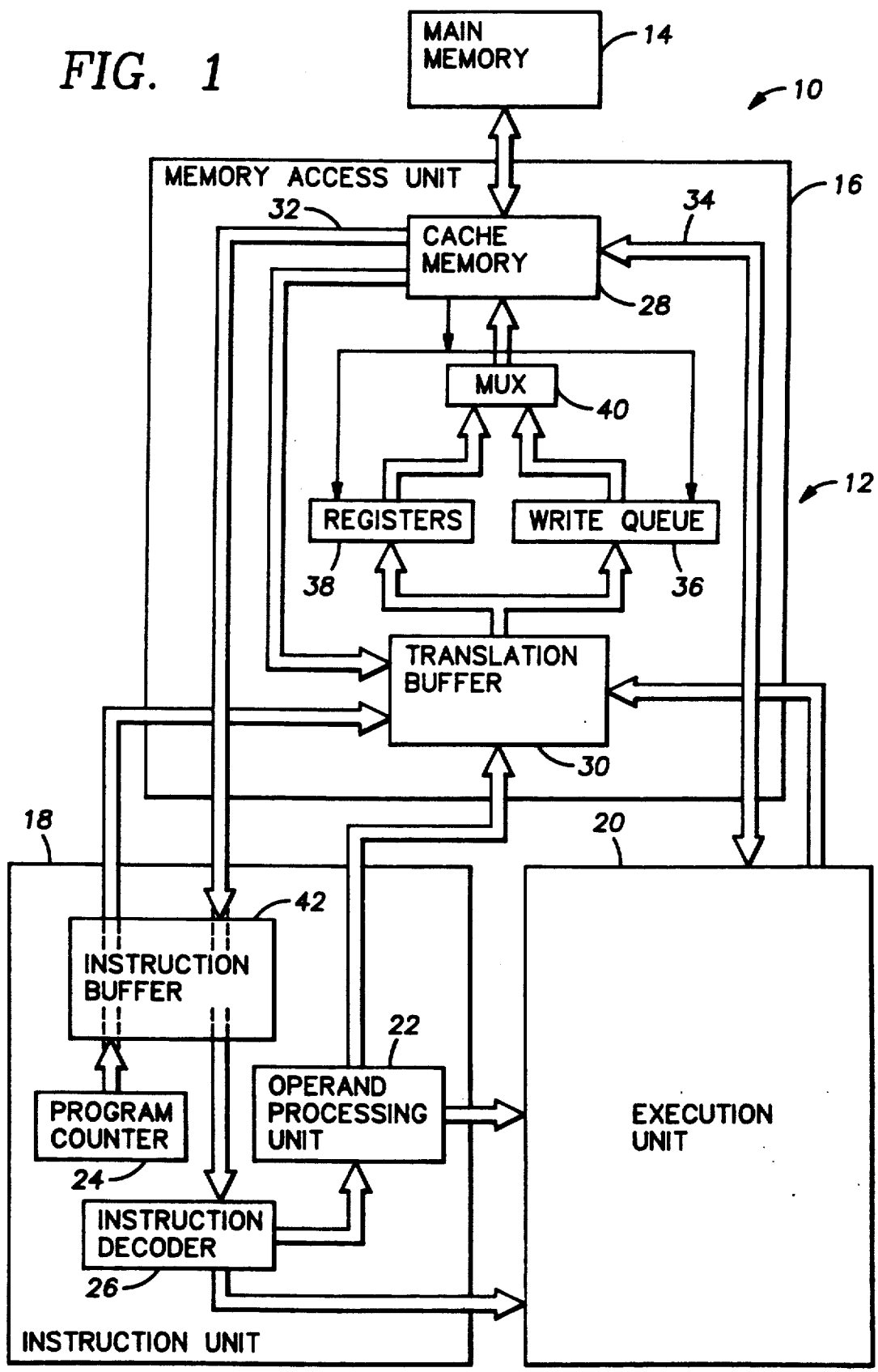
FIG. 1 is a top level block diagram of a portion of a central processing unit and associated memory.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

FIG. 1 is a top level block diagram of a portion of a pipelined computer system 10. The system 10 includes at least one central processing unit (CPU) 12 having access to main memory 14. It should be understood that additional CPUs could be used in such a system by sharing the main memory 14. It is practical, for example, for up to four CPUs to operate simultaneously and communicate efficiently with the shared main memory 14.

Inside the CPU 12, the execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is separated are common to all instructions. Generally, the following steps are performed during the execution of an instruction: instruction fetch, instruction decode, operand fetch, execution, and result store. Thus, by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

As shown in FIG. 1, each CPU 12 is partitioned into at least three functional units: the memory access unit 16, the instruction unit 18, and the execution unit 20.

The instruction unit 18 prefetches instructions, decodes instruction operation codes (opcodes) to obtain operand and result specifiers, fetches operands, and updates the program counter. The instruction unit 18 includes an operand processing unit 22, a program counter 24, an installation buffer 42, and an instruction decoder 26. The program counter 24 is maintained in the instruction unit 18, so that the proper instructions can be retrieved from a high-speed cache memory 28 maintained in the memory access unit 16. The cache 28 stores a copy of a small portion of the information stored in main memory 14 and is employed to increase processing speed by reducing memory access time. Operation of the cache 28 is described in greater detail in conjunction with the description of the memory access unit 16.

The program counter 24 preferably uses virtual memory locations rather than the physical memory locations of main memory 14 and cache 28. Thus, the virtual address of the program counter 24 must be translated into the physical address of main memory 14 before instructions can be retrieved. Accordingly, the contents of the program counter 24 are transferred to the instruction buffer 42, and from the instruction buffer 42 to the memory access unit 16 where a translation buffer 30 performs the address conversion. The instruction is retrieved from its physical memory location in cache 28 using the converted address. The cache 28 delivers the instruction over the data return lines 32 to the instruction buffer 42, and from the instruction buffer 42 to the instruction decoder 26. The organization and operation of a cache and translation buffer are further described in Chapter 11 of Levy and Eckhouse, Jr., Computer Programming and Architecture, The VAX-11, Digital Equipment Corporation, pp. 351-368 (1980).

The operand processing unit (OPU) 22 also produces virtual addresses. In particular, the OPU 22 produces virtual addresses for memory source (read) and destination (write) operands. For at least the memory read operands, the OPU 22 must deliver these virtual addresses to the memory access unit 16 where they are translated to physical addresses. The physical memory locations of the cache 28 are then accessed to fetch the operands for the memory source instructions. For some memory destination instructions, the OPU 22 also delivers the virtual addresses of the operands to the execution unit 20.

The virtual address, for example, is a 32-bit binary number. In addition to transmitting the 32-bit virtual address, the OPU 22 also delivers a 3-bit control field to indicate whether the operand specifies a read or write operation. In the event that the control field indicates that the virtual address corresponds to a read operand, the cache 28 retrieves the data from the identified physical memory location and delivers it over data return lines 34 to the execution unit 20.

Conversely, for a write operation the write address is stored until the data to be written is available. Clearly, for instructions such as MOVE or ADD, the data to be written is not available until execution of the instruction has been completed. However, the virtual address of the destination can be translated to a corresponding physical address during the time required for execution of the instruction. Also, it is desirable for the OPU 22 to pre-process multiple instruction specifiers during this time in order to increase the overall rate at which instructions are performed. For these purposes, the memory access unit 16 is provided with a "write queue" 36 intermediate the translation buffer 30 and cache 28 for storing the physical destination addresses of a plurality of write operations. The write queue 36 maintains the address until the execution unit 20 completes the instruction and sends the data to the memory access unit 16. The data is paired with the previously stored write address and written into the cache 28 at that memory location.

The OPU 22 also operates on instructions that are not memory operands. For example, the OPU 22 also processes immediate operands, short literals, and register operands. In each of these types of instructions the OPU 22 delivers its results directly to the execution unit 20.

The first step in processing the instructions is to decode the instruction operation code (opcode) portion of the instruction. The first segment of each instruction consists of its opcode, which specifies the operation to be performed in the instruction. The decoding is done using a standard table-look-up technique in the instruction decoder 26. The instruction decoder finds a microcode starting address for executing the instruction in a look-up table and passes the starting address to the execution unit 20 Later the execution unit 20 performs the specified operation by executing prestored microcode, beginning at the indicated starting address. Also, the decoder 26 determines where source and destination specifiers occur in the instruction and passes these source and destination specifiers to the operand processing unit 22 for pre-processing prior to execution of the instruction.

The memory access unit 16 includes the cache 28, the translation buffer 30, the write queue 36, a set of registers 38, and a multiplexer 40. As noted above, the cache 28 is a high speed memory used for storing a copy of a small portion of the information stored in the main memory 14. The cache 28 is accessible at a much higher rate than the main memory 14. Its purpose, therefore, is to reduce the average time necessary for a memory access (i.e., a read or write) to be performed. Since the cache 28 stores only a small portion of the information stored in main memory, there will occasionally be instructions which attempt to access memory not contained in the cache 28. The cache 28 recognizes when these "misses" occur, and in these instances the cache 28 retrieves the identified data from main memory 14. Of course, during these "misses" performance of the CPU 12 will suffer, but the overall memory access speed is increased.

The translation buffer 30 is a high-speed, associative memory which stores the most recently used virtual-to-physical address translations. In a virtual memory system, a reference to a single virtual address can cause several memory references before the desired information is made available. However, where the translation buffer 30 is used, translation is reduced to simply finding a "hit" in the translation buffer 30. The use of the translation buffer 30 reduces the number of times that the main memory 14 must be accessed and thereby increases overall processor speed. Of course, the memory references will occasionally "miss" on those translations stored in the translation buffer 30. In the event of a "miss", the proper virtual-to-physical address translation is retrieved from memory and stored in the translation buffer 30. The comparison is attempted a second time, necessarily resulting in a "hit".

Once the virtual-to-physical address translation is complete, the physical address is transferred to one of the write queue 36 and the register 38. As its name suggests, the write queue 36 receives the physical address only if the corresponding instruction is a write to memory. The purpose of the write queue 36 is to provide a temporary storage location for the physical write address of the write instruction. Because of the pipeline nature of the CPU 12, the write address is available before the data to be stored therein is available. In fact, the data will only become available after the execution of the instruction in the execution unit 20. Moreover, because it is desired to pre-process multiple specifiers for instructions in the pipeline, it is likely that there will be a plurality of physical write addresses waiting for their corresponding data. Accordingly, the write queue 36 is a multiple position first-in, first-out buffer to accommodate a plurality of physical write addresses.

Conversely, if the instruction corresponding to the physical address is a read instruction, then the translation buffer 30 provides the physical address for an operand of the read instruction. The read address is transferred to one of the registers 38 where it is selected by the multiplexer 40 and delivered to the cache 28. The cache 28 accesses the identified memory location and delivers the data stored at that location to the execution unit 20 via the data return lines 34.

The ability of the CPU 12 to immediately access the cache 28 during operand fetch for the reads, but being delayed during instruction execution for the writes, can cause timing problems in the pipeline. For example, sequential instructions often require the first instruction to modify a memory location while the subsequent instruction reads this same address. Since both instructions are being executed in a series of smaller steps it is possible for the read and write operations to be performed out of sequence. Even though the specifiers for the write instruction are processed before the specifiers for the read instruction, and the write operation is executed before the read operation, the delay in execution may allow one or more operands for the read operation to be fetched before the result of the write operation is stored. Therefore, as a result of the fetch of the read operands, "stale" data might be returned to the execution unit.

Figure 2:
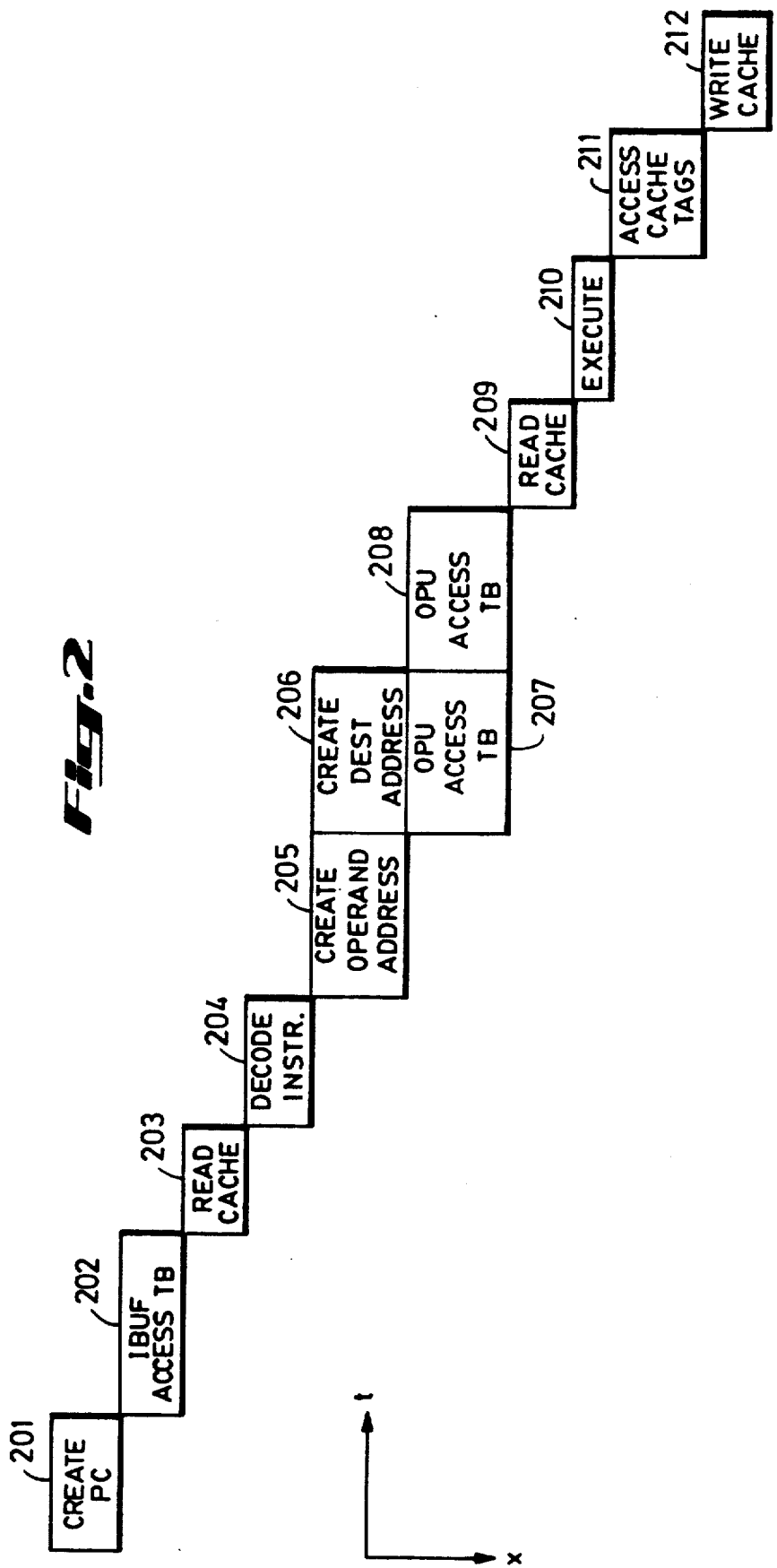
FIG. 2 is a functional diagram of the pipeline processing of a longword MOVE instruction.

FIG. 2 illustrates the operation of the instruction pipeline for a 4-byte move instruction of the form "MOVL MEM1, MEM2" where MOVL designates the operation to be performed and MEM1 and MEM2 are operand specifiers specifying a source address and a destination address, respectively. The boxes along the diagonal direction in FIG. 2 show the successive actions that CPU 12 takes to perform the move instruction. From left to right in FIG. 2, the actions occur at eleven successively advanced cycles or intervals in time (t). From top to bottom in FIG. 2, the actions occur in ten successive stages along the extent (x) of the pipeline.

In the first stage the program counter (PC) 24 for that instruction is created at location 201. This is done either by incrementing the value of the program counter (24 in FIG. 1) for the previous instruction, or by using the target address of a branch instruction. In the second stage, at location 202, the instruction unit 18 accesses the translation buffer 30 with the virtual address of the program counter 24. The translation buffer 30 converts the virtual address to a physical address and downloads a block of data from the memory unit cache 28 to the instruction buffer 42 in the instruction unit. It is only necessary to perform the second stage if the instruction buffer 42 does not contain the instruction indicated by the PC 24. The cache 28 is read at location 203 in the third stage to retrieve the instruction MOVL indicated by the PC 24. At location 204 the fourth stage decodes the instruction by accessing the decode table with the opcode from the MOVL instruction.

Thereafter, in the fifth stage at location 205 the operand virtual address is created from the first operand MEM1. Similarly, at a later time in the fifth stage at location 206, the destination virtual address is created from the second operand MEM2. At this same time in the sixth stage, at location 207, the OPU 22 accesses the translation buffer 30 to convert the operand virtual address into a physical address. Likewise, at a later time in the sixth pipeline stage, at location 208, the OPU 22 accesses the translation buffer 30 to convert the destination virtual address into a physical address.

Of course, the write operation to the physical address corresponding to MEM2 cannot be completed until the data to be stored has been read at the physical address corresponding to MEM1. Thus, the MEM2 address is stored in the write queue 36 until the data is available. The seventh stage at location 209 reads the memory access unit cache 28 and delivers that data to the execution unit 20.

In the eighth stage, at location 210, all of the operand data and result addresses are available, and the instruction is executed. In the ninth stage, at location 211, the data and a write flag are delivered to the memory access unit 16, the write queue address is removed from the write queue, and the cache tags are accessed to test for a cache hit. Assuming a cache hit, the actual write occurs in the tenth and final stage at location 212.

Accordingly, it can be seen that with the advent of pipeline processing, memory access functions are generated from multiple locations. Such as, the OPU 22, the PC 24, and the execution unit 20. Moreover, because of the pipelined nature of the computer system, these multiple memory requests have the potential of occurring at the same time. Thus, in order to avoid the complicated and expensive proposition of constructing dedicated hardware for handling the memory requests from each of the multiple sources, a multiplexing and prioritizing scheme for sharing the translation buffer 30 and cache 28 resources is provided.

Figure 3:
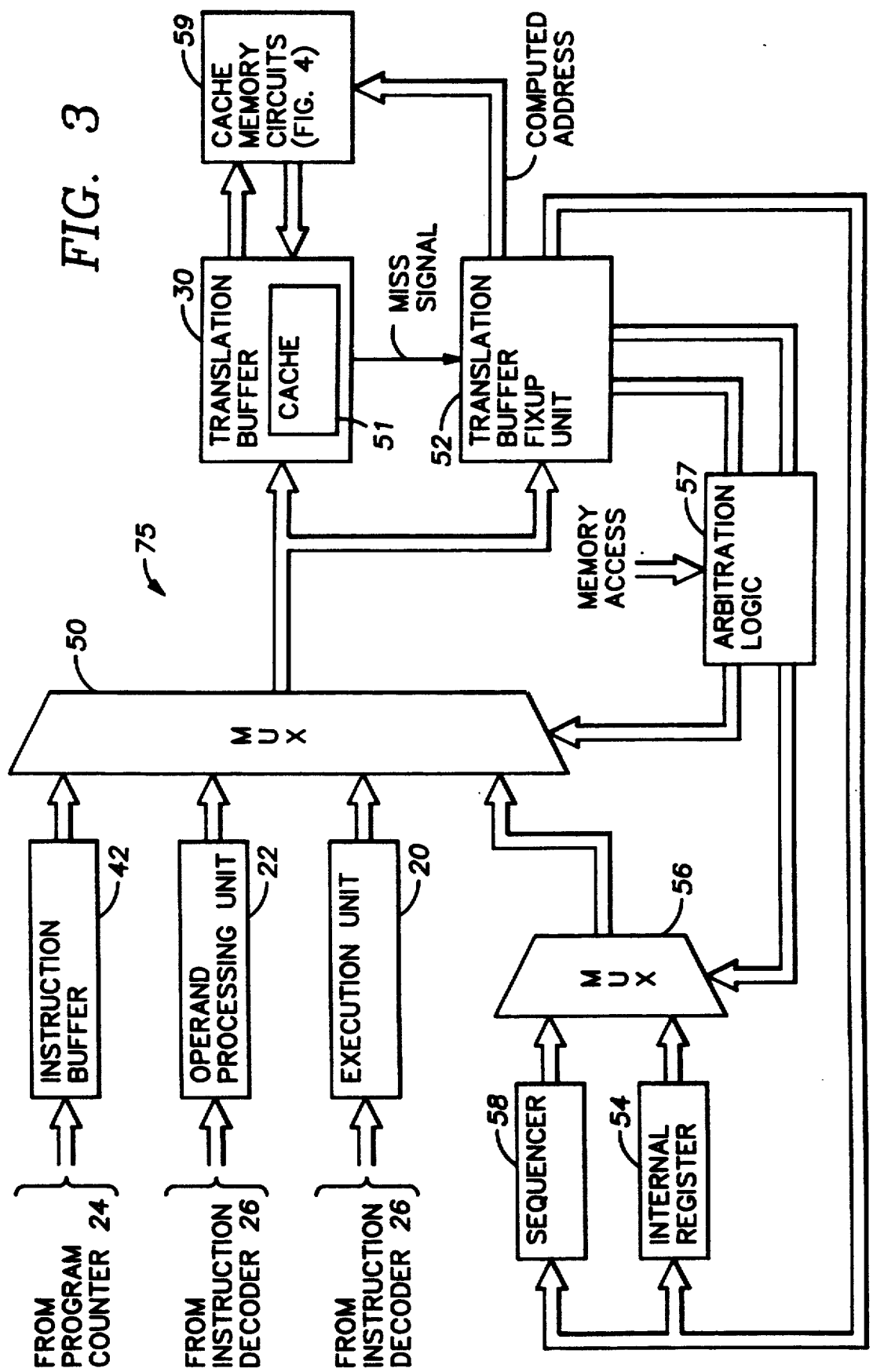
FIG. 3 is a block diagram of a cache memory, a translation buffer and a translation buffer fixup unit interfaced with multiple ports capable of generating memory requests.

Referring now to FIG. 3, the operation of the prioritized and multiplexed access to the translation buffer 30 is described. The translation buffer 30 is connected to receive virtual addresses from five different sources. Three of theses sources are external to the memory access unit 16 and are, hereafter, generally referred to as external. The remaining two sources are controlled from within the memory access unit 16 and are, hereafter, generally referred to as internal. These internal registers are used during translation buffer "misses" to retrieve the virtual-to-physical translation from memory and place it in the translation buffer 30.

The external sources include the instruction buffer 42, which is responsible for delivering instruction pre-fetch addresses, the OPU 22 which delivers operand pre-fetch addresses, and the execution unit 20 which also delivers operand addresses. The translation buffer 30 is unconcerned with which of the external addresses are being processed, as all are handled identically.

Each of these external sources is delivered to the inputs of a multiplexer 50, which controllably delivers the selected input to the translation buffer 30. The multiplexer 50 is a first multiplexing means for selecting a selected one of the memory access requests from a selected one of the pipelined stages in the pipelined computer system according to a first priority scheme. The translation buffer 30 compares the received virtual address to a cache 51 of recently used virtual-to-physical address conversions. If a match is found, the translation buffer 30 selects the corresponding physical address and delivers it to the cache 28. There is no need to access the cache 28 to fetch the virtual-to-physical translation since it is already present in the translation buffer cache 51 by virtue of its earlier use. In this respect, the translation buffer 30 greatly enhances processor speed by reducing the number of accesses to memory.

However, the translation buffer cache 51 contains only a small number of the virtual-to-physical translations. Thus, it is possible that the virtual address currently being translated is not present in the translation buffer cache 51. When this happens, it is necessary to retrieve the conversion from memory and place it in the translation buffer cache 51, so that the virtual-to-physical conversion can be completed.

The virtual address delivered by the selected external source is also delivered to a translation buffer fixup unit (TB Fixup) 52. As its name implies, TB Fixup 52 is primarily dedicated to retrieving those conversions not present in the translation buffer cache 5 and placing them in the translation buffer 30.

The TB Fixup 52 receives the virtual address from the multiplexer 50; however, it is only necessary to fix the translation buffer 30 when a "miss" occurs. Accordingly, the translation buffer 30 delivers a miss signal to the TB Fixup 52 to allow the computed address of the conversion to be delivered to the cache 28. In the event of a TB "miss", the conversion is retrieved from the cache 28 and stored in the translation buffer cache 51. Thus, the immediately subsequent comparison of the translation buffer cache 51 to the pending virtual address must necessarily result in a "hit". Therefore, TB Fixup 52 temporarily asserts control over the translation buffer 30 to update the translation buffer cache 51, whereby the pending conversion is altered from a "miss" to a "hit" and the virtual-to-physical translation is completed.

Occasionally, more elaborate methods are necessary in order to recover from a TB "miss". In these cases, rather than access the cache 28 directly, TB Fixup 52 must present the virtual address to the translation buffer 30 for a second time. To accomplish this second access an internal register 54 is loaded with the virtual address by TB Fixup 52. The internal register 52 has access to one of the input ports of the multiplexer 50 through a two-input multiplexer 56. A sequencer 58 also receives input from TB Fixup 52 over the same bus as the internal register 54. The sequencer 58 is employed during multi-precision operations or operations to read multiple contiguous bytes from memory. The sequencer 58 increments the address and delivers it to one input of the multiplexer 56.

Arbitration logic 57 controls both of the multiplexers 50, 56 according to a prioritization scheme. The internal registers 54, 58 are, of course, assigned the highest priority. Clearly, if a TB miss has occurred, then the TB 30 is stalled until the cache 51 can be updated. Therefore, the internal registers 54, 58 need the highest priority in order to resolve the current miss. When, however, the internal registers 54, 58 are not being used, then the arbitration logic 57 must determine priority between the external sources 20, 22, 42.

Priority is assigned among the external sources 20, 22, 42 according to their impact upon the instruction currently being processed by the execution unit 20. Therefore, any request by the execution unit 20 will necessarily be associated with the instruction currently being processed. Accordingly, execution unit requests are assigned the highest priority. That is to say, even if prior OPU 22 or IBUF 42 requests are pending when the execution unit 20 issues a memory access request, the arbitration logic 57 will grant the execution unit request access to the TB 30.

This same priority scheme is carried into the remaining two external sources 22, 42, such that since the OPU 22 is operationally closer to the execution unit 20, it is assigned the next highest priority. Thus, the IBUF 42, since it has the least impact on the current instruction, is assigned the lowest priority. It should also be noted that the instruction decoder 26 can be as far as six instructions ahead of the instruction currently being executed. Thus, any delays in processing the IBUF 42 requests are easily absorbed without impacting the instruction processing speed of the execution unit 20.

The arbitration logic 57 receives three request inputs from the three external sources 20, 22, 42 in order to determine when a request is pending. These request inputs are pipelined through the translation buffer 30 to the cache memory circuits 59 shown in FIG. 4.

Figure 4:
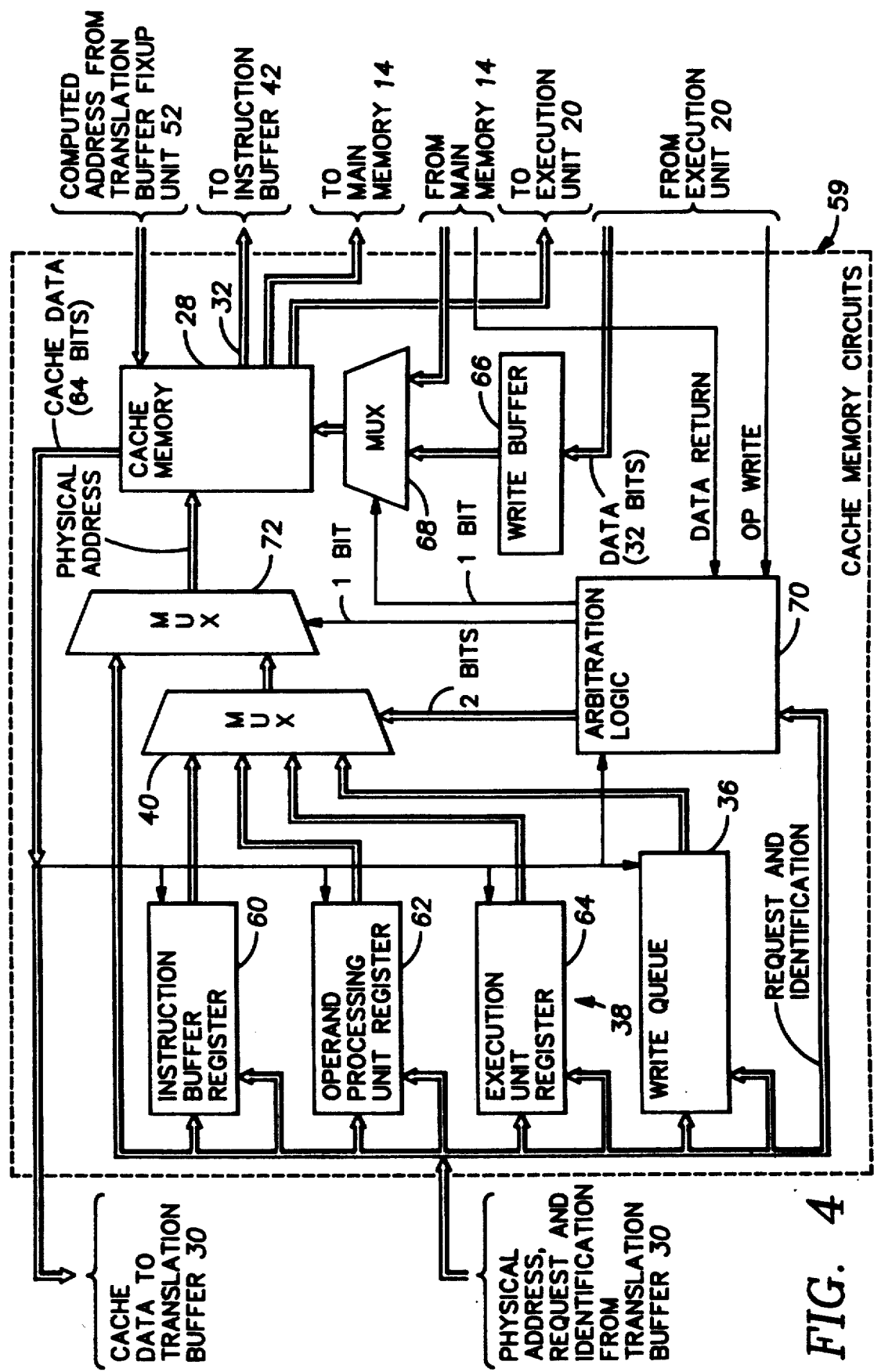
FIG. 4 is a block diagram of the cache memory and its associated address and data interfaces.

Referring now to FIG. 4, there is shown a block diagram of the cache memory circuits 59 including the cache memory 28 and its associated address and data interfaces. Memory requests pipelined through the translation buffer 30 include addresses identifiable to their source, and are separately stored in the multiple registers 38 which include separate registers 60, 62, 64 for the IBUF, OPU, and execution unit. In this manner, the separate requests are again prioritized, so that if an individual request misses in the cache 28, then another pending request is processed while the main memory 14 operates to return the desired data to the cache 28.

At this point the priority among the external registers 60, 62, 64 remains identical to the priority of the external sources 20, 22, 42 (FIG. 3). The only difference here is that the cache memory 28, unlike the translation buffer 30, is constructed to handle other cache requests while a refill from the main memory 14 is pending. Thus, a miss in the cache memory 28 does not stall any other pending memory access.

The write queue 36, of course, is assigned the highest priority since the addresses stored in it are associated with data delivered from the execution unit 20. In order to transfer sixty-four bits of data from the 32-bit data bus from the execution unit 20 to the 64-bit data bus of the cache memory, a write buffer 66 is connected between the 32-bit data bus from the execution unit 20 and the cache 64-bit data bus. Thus, the write buffer 66 temporarily stores at least 32 bits of the execution unit data while the cache 28 completes its current operation. However, in order to avoid stalling the execution unit 20 at the end of the next clock cycle, the write buffer 66 is preferably emptied into the cache 28 at the next clock cycle. In order to accomplish this quick handling of the write buffer 66, the write queue 36 must have the highest priority access to the cache 28.

As suggested above, the cache data bus is connected to both the main memory 14 and to the write buffer 66. Thus, a multiplexer 68 is used by the cache 28 to selectively load the contents of main memory 14 or the write buffer 66. Likewise, the multiplexer 40 controls access to the cache address bus. Each of the registers 38 and the write queue 36 are connected as inputs to the multiplexer 40, which is controlled by arbitration logic 70. Further, the main memory has a higher priority than even the write queue 36. This is true so that the cache 28 can receive the refill data from main memory 14 in order to handle the previously missed memory request.

For example, assuming that the execution unit 20, OPU 22, and IBUF 42 have memory requests pending. The arbitration logic 70 responds by selecting the contents of the execution register 64. If this memory request misses in the cache 28, then a refill from the main memory 14 is requested and the cache 28 sets a status flag in the execution unit register 64 indicating that a miss has occurred. The arbitration logic 70 periodically samples the status flags in each of the registers 60, 62, 64, and the write queue 36. When the arbitration logic detects the miss status flag in the execution unit register 64, the prioritization scheme will fall off to the next highest priority request and select that input via the multiplexer 40. Thus, the OPU request is passed to the cache 28 and, assuming a hit in the cache 28, the data is retrieved and delivered to the proper destination. When the refill data becomes available from the main memory 14, a data return signal is delivered to the arbitration logic 70, which selects the main memory input to the multiplexer 68. Even though an IBUF request is still pending, the cache refill has priority so that the cache 28 may properly handle the pending execution unit miss.

In the event that no other memory requests are pending when a new physical address is delivered by the translation buffer 30, then the arbitration logic 70 recognizes that the request can be immediately handled. Thus, the arbitration logic bypasses the request directly to the cache 28 via a multiplexer 72. In this manner, time is not expended uselessly loading and unloading one of the registers 38.

The multiplexers 40 and 75 comprise a second multiplexing means for selecting a selected physical address from among stored physical addresses from the storage locations (registers 60, 62, and 64) according to a second priority scheme. This second priority scheme is based upon the pipelined stages in the pipelined computer system (10 in FIG. 1) from which memory access requests corresponding to the stored physical addresses originated.

The arbitration logic 70 receives a large number of control inputs so as to effect control over the multiplexers 40, 72, 68. For example, in addition to having access to the status flags in each of the registers 38 and the write queue 36, the arbitration logic 70 also receives a request and identification signal pipelined with the physical address. The request signals are required in order for the arbitration logic to identify when a memory access function has been requested. The identification signal is useful in determining which of the registers 38 or write queue 36 is being loaded with the request.

Figure 5:
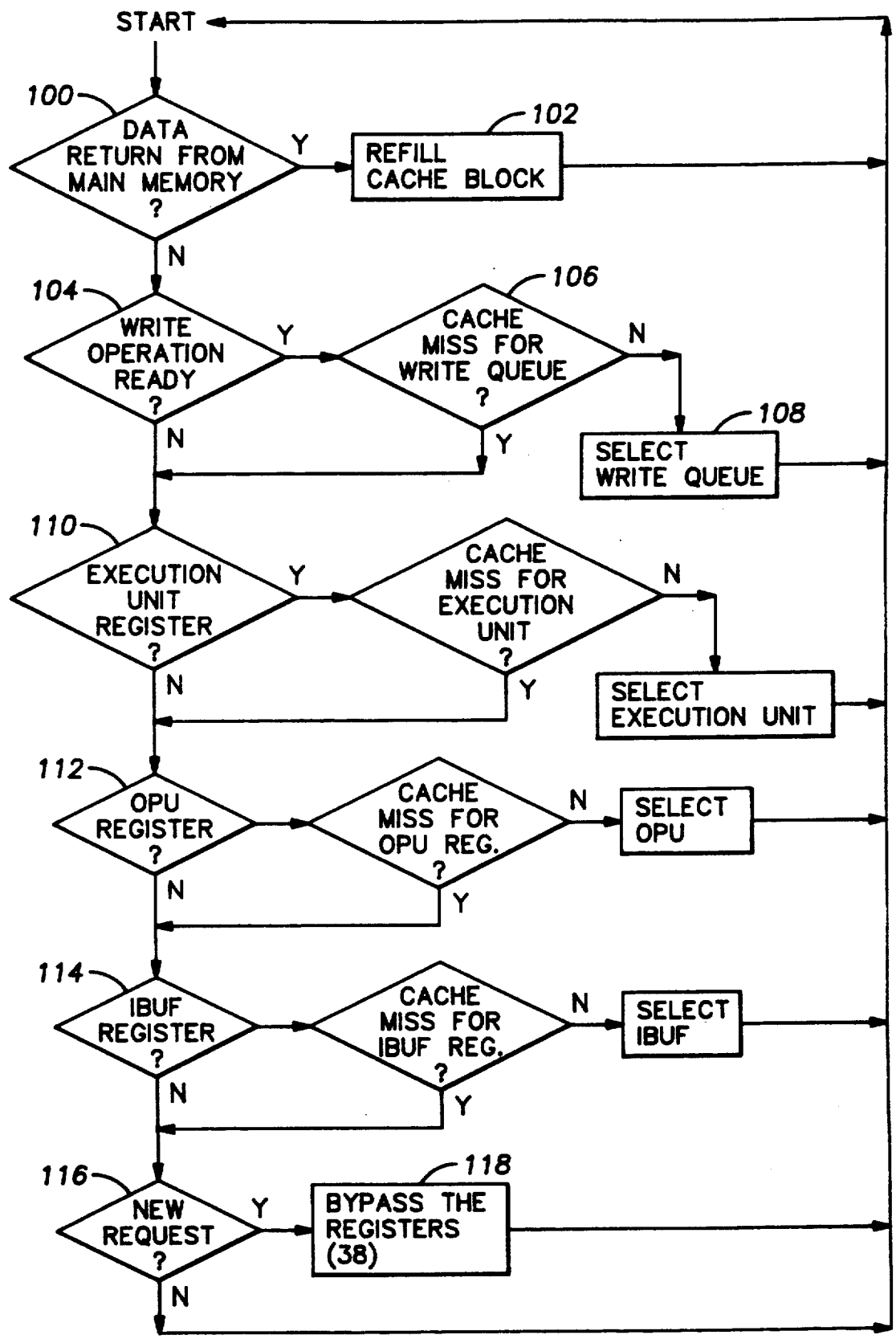
FIG. 5 a flowchart representation of a functional control scheme implemented by arbitration logic which arbitrates among memory requests by the multiple ports.

Referring now to FIG. 5, a flowchart representation of the functional control scheme implemented by the arbitration logic 70 is shown. Beginning at decision block 100, the logic 70 first checks the data return signal to determine if refill data is ready from the main memory 14. If the signal on the request line indicates that the write queue includes an address for a write operation, and the signal on the opwrite line from the execution unit 20 indicates that the execution unit has data for a write operation, then a write operation is ready to be performed. Therefore, if the main memory data is ready, control passes to block 102 where the main memory input to the multiplexer 68 is selected and control returns to the starting point. On the other hand, if cache refill data is not being returned from the main memory 14, then control passes to decision block 104 where the request line for the write queue 36 and the opwrite line are polled. If both signals are asserted, control passes to block 106 where the status flag of the write queue 36 is polled to determine if a miss is currently pending for the write queue. Absent a miss, the write queue input to the multiplexer 40 is selected in block 108. In the event that either the write queue select has not been asserted or a miss is pending for the write queue 36, then control passes to the next lower priority request.

Similar operations are performed for the execution register 64, OPU register 62, and IBUF register 114 at decision blocks 110, 112, 114 respectively. However, if no requests are currently pending and control has proceeded to decision block 116, then the arbitration logic 70 checks to determine if a new request is just arriving from the translation buffer 30. If a new request is available and no other requests are pending, then the arbitration logic 70 acts to bypass the registers 38 and multiplexer 40 by operating the multiplexer 72 to bypass the registers 38 in block 118.

We claim:

1. An apparatus for controlling independent memory access requests originating from a plurality of pipelined stages in a pipelined computer system, comprising:
   first multiplexing means for selecting a selected one of said memory access requests from a selected one of said pipelined stages in said pipelined computer system according to a first priority scheme;
   a translation buffer for receiving said selected one of said memory access requests from said first multiplexing means, and converting said selected one of said memory access requests to a physical memory address;
   a plurality of storage locations for temporarily storing physical memory addresses from said translation buffer;
   second multiplexing means for selecting a selected physical address from among stored physical addresses from said storage locations according to a second priority scheme, said second priority scheme being based upon the pipelined stages in said pipelined computer system from which memory access requests corresponding to said stored physical addresses originated; and
   a cache memory for receiving said selected one physical address from said second multiplexing means, comparing said selected physical address to addresses currently maintained in said cache memory, accessing data stored in said cache memory at said selected physical address in response to a hit, and initiating a transfer of data from a main memory to said cache memory in response to detecting a miss.

2. An apparatus, as set forth in claim 1, wherein said second multiplexing means includes a multiplexer, said multiplexer has an input connected to said translation buffer for receiving said physical memory addresses from said translation buffer, and said multiplexer has an output connected to an input of said cache memory for transmitting said physical memory addresses to said cache memory.

3. A method of controlling independent memory access requests originating from a plurality of pipelined stages in a pipelined computer system, comprising the steps of:
   selecting a selected one of said memory access requests from a selected one of said pipelined stages in said pipelined computer system according to a first priority scheme;
   converting said selected one of said memory access requests to a physical memory address;
   temporarily storing, in a plurality of storage locations, physical addresses converted from corresponding ones of said memory access requests;
   selecting a selected physical address from among stored physical addresses from said storage locations according to a second priority scheme, said second priority scheme being based upon the pipelined stages in said pipelined computer system from which memory access requests corresponding to said stored physical addresses originated; and
   comparing said selected physical address to addresses currently maintained in a cache memory, accessing data stored in said cache memory at said selected address in response to a hit, and initiating a transfer of data from a main memory to said cache memory in response to detecting a miss.

4. A method, as set forth in claim 3, further including the steps of temporarily ignoring a missed physical address in response to detecting a miss in said cache memory, and delivering a next highest priority physical address from one of said storage locations to said cache memory.

5. A method, as set forth in claim 4, further including the step of delivering said missed physical address to said cache memory in response to said cache memory receiving data transferred from said main memory.

6. A method of servicing memory access requests originating from an instruction decoder, an operand processing unit, and an execution unit in a pipelined computer system, said method comprising the steps of:
   (a) selecting said memory access requests according to a first priority scheme in which requests from the execution unit have priority over requests from the operand processing unit and from the instruction decoder, and requests from the operand processing unit have priority over requests from the instruction decoder,
   (b) using a translation buffer to translate virtual addresses for the memory access requests selected in step (a) to corresponding physical memory addresses,
   (c) temporarily storing said corresponding physical memory addresses in at least three registers,
   (d) selecting the physical memory addresses stored in said registers based upon their corresponding memory access requests according to a second priority scheme in which requests from the execution unit have priority over requests from the operand processing unit and from the instruction decoder, and requests from the operand processing unit have priority over requests from the instruction decoder, (e) delivering the physical memory addresses selected in step (d) to a cache memory, comparing the selected physical address to addresses currently maintained in said cache memory, accessing data stored at the selected physical address when the selected physical addresses are currently maintained in the cache memory, and transferring data from a main memory to the cache memory when the selected physical addresses are not currently maintained in the cache memory.

7. A method, as set forth in claim 6, wherein said step (a) includes selecting memory access requests from a translation buffer fix-up unit, and wherein said first priority scheme gives said translation buffer fix-up unit priority over requests from said instruction decoder, said operand processing unit and said instruction unit.

8. A method, as set forth in claim 4, further including the step of temporarily delaying the transfer of data from the main memory to the cache memory to select a next highest priority physical address stored in said registers and access data stored at said next highest priority physical address when the next highest priority physical address is currently maintained in said cache.

9. A method, as set forth in claim 8, wherein said step (d) includes selecting a physical address from a write queue, and wherein said second priority scheme gives said write queue priority over requests from said instruction decoder, said operand processing unit and said execution unit.

* * * * *

UNITED STATES PATENT AND TRADEMARK OFFICE
CERTIFICATE OF CORRECTION

PATENT NO. : 5,222,223
DATED : June 22, 1993
INVENTOR(S) : David A. Webb, Jr. et al It is certified that error appears in the above-indentified patent and that said Letters Patent is hereby corrected as shown below:

Column 5, line 37, after "20", add --.--.

Column 8, line 39, change "5", to --51--.

Column 11, line 63, delete "one".

Column 12, line 11, change "of" to --for--.

Column 12, line 47, change "of" to --for--.

Signed and Sealed this

Twenty-second Day of March, 1994

*Attest:*

BRUCE LEHMAN

*Attesting Officer*     *Commissioner of Patents and Trademarks*